April 6, 1948.                    J. P. BUTTERFIELD                    2,439,073
                                    SEAL CONSTRUCTION
                                  Filed June 26, 1944                  3 Sheets-Sheet 1
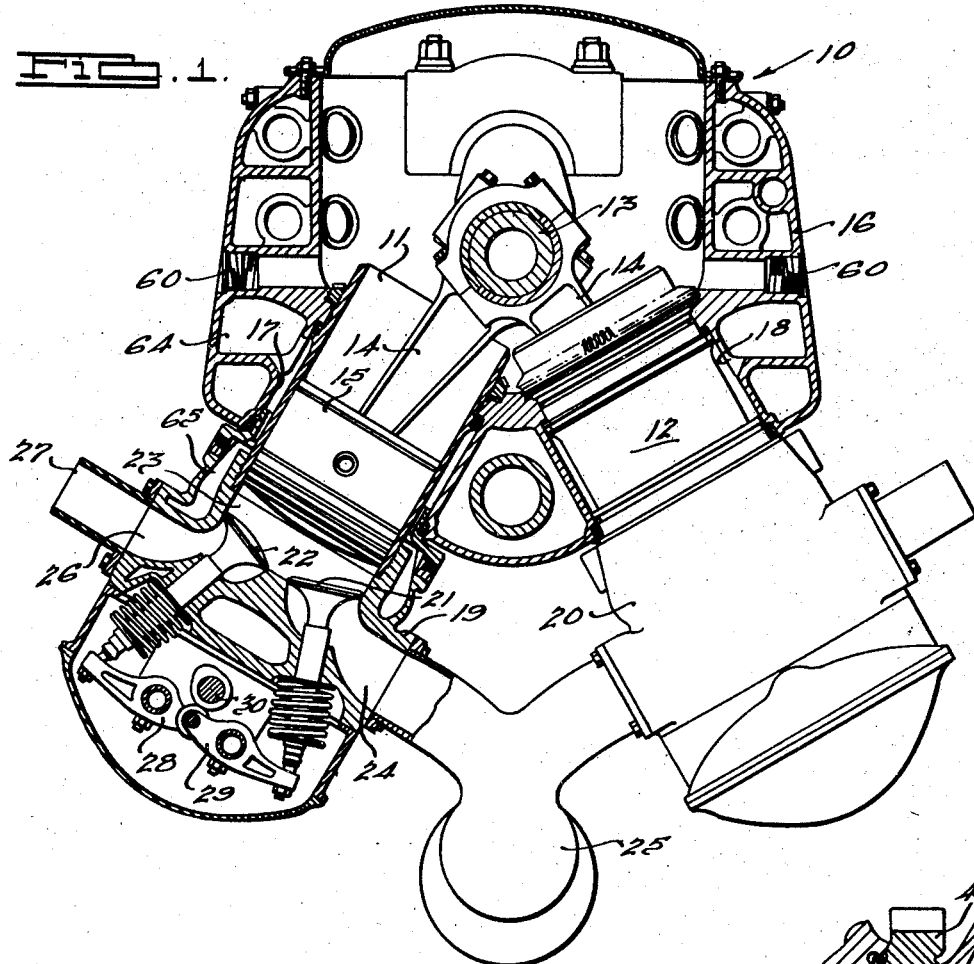
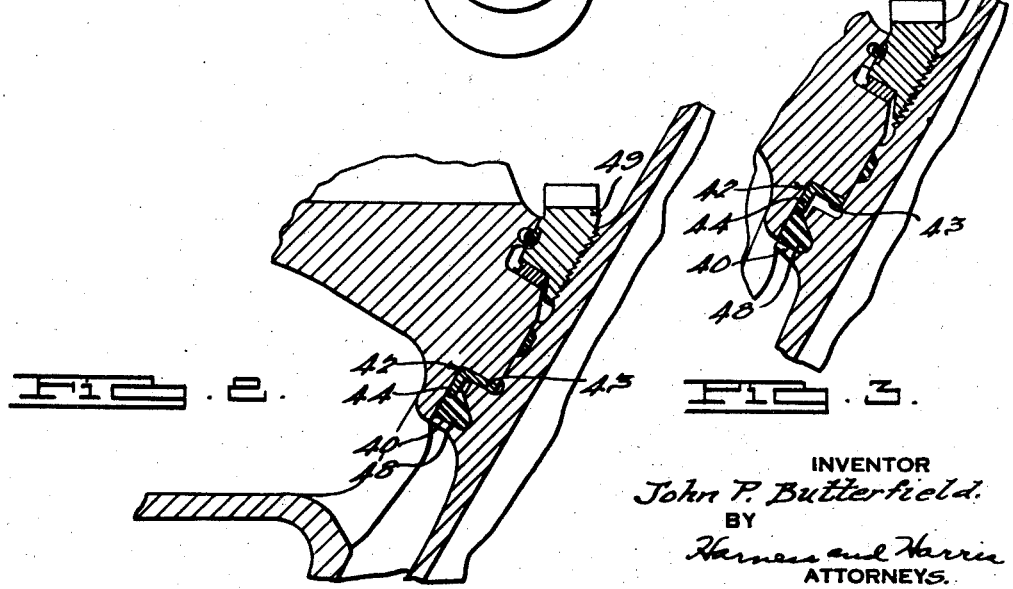
INVENTOR
John P. Butterfield.
BY
Harness and Harris
ATTORNEYS.

April 6, 1948. J. P. BUTTERFIELD 2,439,073
SEAL CONSTRUCTION
Filed June 26, 1944 3 Sheets-Sheet 2

INVENTOR
John P. Butterfield.
BY
Harness and Harris
ATTORNEYS.

April 6, 1948.  J. P. BUTTERFIELD  2,439,073
SEAL CONSTRUCTION
Filed June 26, 1944  3 Sheets-Sheet 3
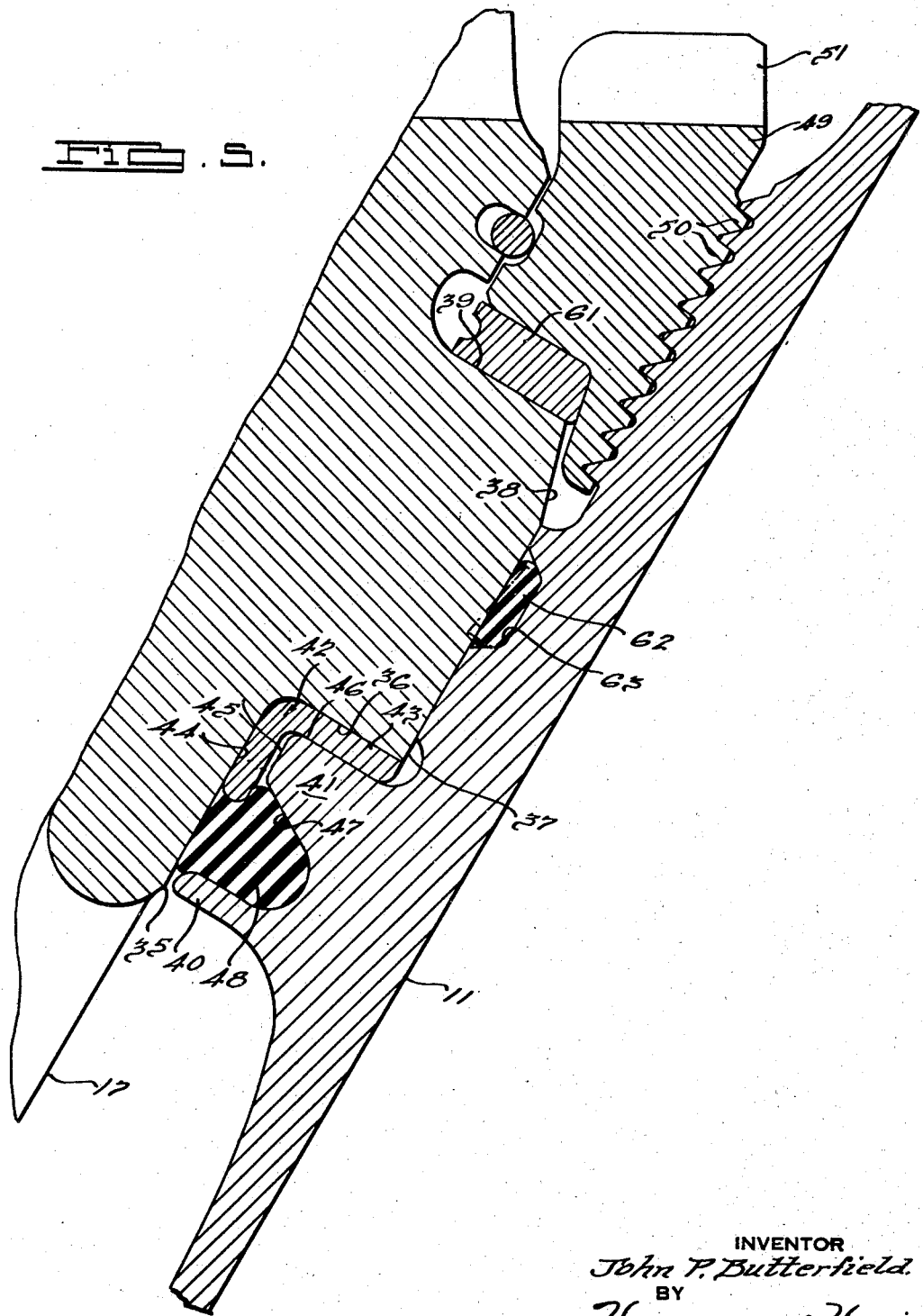
INVENTOR
John P. Butterfield.
BY
Harness and Harris
ATTORNEYS.

Patented Apr. 6, 1948

2,439,073

UNITED STATES PATENT OFFICE 2,439,073

SEAL CONSTRUCTION

John P. Butterfield, Highland Park, Mich., assignor to Chrysler Corporation, Highland Park, Mich., a corporation of Delaware Application June 26, 1944, Serial No. 542,035

4 Claims. (Cl. 123—195)

This invention relates to a sealing construction. More specifically it relates to obtaining an efficient seal between a cylinder and crankcase in an aircraft engine.

The problem of properly sealing parts of an engine is very important, and this is particularly true of aircraft engines. It is frequently the practice to provide deformable seals so that deformation will insure a more efficient sealing contact between the parts involved. The difficulty has been that in general deformable seals must be deformed before installation. This gives rise to problems of handling. Another difficulty is that it is impossible to know before installation just how much a seal should be deformed for efficient operation.

I have developed a sealing construction and arrangement of parts that permits the deformation of the seal to be delayed until installation with the parts to be sealed.

An object of the present invention is to provide an improved sealing construction suitable for use with parts of an engine.

A further object is to improve a sealing arrangement in such a way that the deformation of a deformable seal may be delayed until its installation.

Another object is to provide improvements in the seating of parts upon one another that are to be sealed. This involves the provision of a special member that not only contributes to the seating of the parts but also aids in the deformation of the seal employed.

Other objects will appear from the disclosure.

In the drawings:

Fig. 1 is a transverse section through an aircraft engine embodying the novel features of the present application;

Figs. 2 and 3 are similar sectional views through a portion of the engine, showing steps in the assembly of the engine;

Fig. 5 is an enlarged sectional view of a portion of the engine, showing the novel sealing construction of the present invention.

Figure 4:
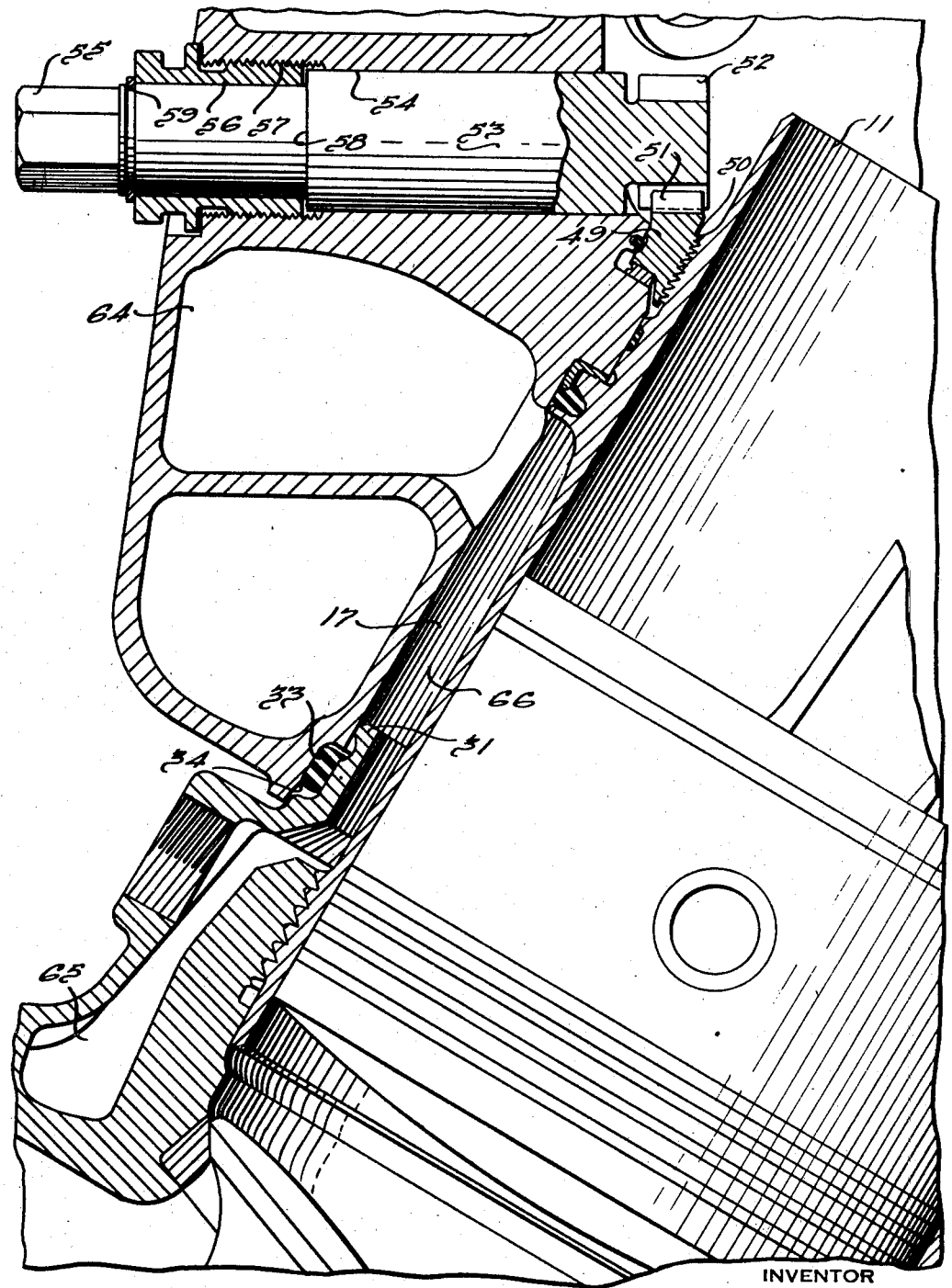
Fig. 4 is a sectional view through a portion of the engine showing the manner and apparatus for assembling parts of the engine.

The reference character 10 designates an engine suitable for aircraft use. The engine is of the V-type and comprises banks of cylinders angularly related like the legs of an inverted V. Fig. 1 shows a cylinder 11 of one bank and cylinder 12 of the other bank. Mounted at an apex above the cylinders is a crankshaft 13 connected by connecting rods 14 to pistons 15 reciprocally mounted in the cylinder, only the piston in the cylinder 11 being shown. The engine has a crankcase or engine casing 16 having openings 17 and 18 in which the cylinders 11 and 12 are positioned. Secured at the openings 17 and 18 in the crankcase 16 are engine heads 19 and 20 housing intake and exhaust valves 21 and 22. The intake valve 21 provides an inlet to a chamber 23 beyond the cylinder 11 from a passage 24 connected with an intake manifold 25, which is also connected to the engine head 20 in the same way. The exhaust valve 22 provides an outlet for the chamber 23 to a passage 26 connected with an outlet pipe 27. The valves 21 and 22 are controlled through rocker arms 28 and 29 from a camshaft 30.

The head 19 has a tubular portion 31 inserted within the opening 17 and fixed therein in sealed relation with the aid of a seal 33 fitted in an enlargement 34 at the lower end of the opening 17.

The opening 17 has at an intermediate region a portion 35 of a certain diameter extending for a short distance and an inwardly extending shoulder 36 at the end thereof. Beyond the shoulder 36 the opening 16 has a portion 37 of less diameter, which leads to a tapered portion 38 terminating in a shoulder 39. The cylinder 11 has at an intermediate region a flange 40 extending outwardly into close proximity with the portion 35 of the opening 17 in the crankcase 16. Spaced from the flange 40 is another flange 41 extending outwardly from the cylinder 11 in somewhat spaced relation to the shoulder 36 and into spaced adjacency with portion 35 of the opening 17. Positioned between the flange 41 and the portion 35 and shoulder 36 is a ring 42 having an inwardly extending radial flange 43 clamped between the shoulder 36 and the flange 41 on the cylinder 11, and a cylindrical flange extending outwardly of the flange 41 in contact with portion 35 of opening 17 to a point somewhat beyond the flange 41 and between flanges 40 and 41. The outer sides of ring flanges 43 and 44 are joined in a relatively large radius that mates with a relatively large radius, though somewhat smaller than the former, joining the portion 35 and shoulder 36 of the crankcase opening 17. The inner sides of the ring flanges 43 and 44 are joined in a relatively small radius that mates with a correspondingly small radius joining an outer edge 45 and an outer face 46 of cylinder flange 41. An inner face 47 of cylinder flange 41 is at an angle to a radial direction.

A deformable seal 48 formed of rubber or other suitable material is positioned in the groove formed by cylinder flanges 40 and 41 and within the portion 35 of crankcase opening 17. The portion of cylindrical ring flange 44 between cylinder flanges 40 and 41 extends into the seal 48 deforming it and exerting upon it sufficient pressure to effect a good sealing relation with the crankcase opening 17 and the cylinder 11.

Figs. 2 and 3 show how the seal 48 is brought into place. As seen in Fig. 3, the seal is positioned between cylinder flanges 40 and 41, and the cylinder is positioned in crankcase opening 17. The seal is surrounded by the portion 35 of opening 17 before seal and cylindrical ring flange 44 are brought together sufficiently for the flange 44 to be pressed into the seal and thereby to deform or compress it into sealing relation with the crankcase 16 and the cylinder 18. This means that the seal is entirely surrounded before it is deformed or compressed, and so the deformation can take place simply and easily because of the complete confinement. The use of the ring 42 with its cylindrical flange 44 extending between cylinder flanges 40 and 41 makes this possible.

The crankcase 16 may be formed of a metal such as an aluminum alloy which is difficult to machine with a small radius joining the shoulder 36 and the portion 35 of the opening 17. Without the ring 42 the radius joining portion 35 and shoulder 36 would have to be small to mate with the small radius customarily formed at the corner of the cylindrical flange 41. However, this difficulty is avoided by the use of the ring 42, which has a small interior corner radius to mate with the corner of cylinder flange 41 and a large exterior corner radius to mate with the corner between portion 35 and shoulder 36 in crankcase opening 17. Without the ring 42 it would be difficult if not impossible to seat cylinder flange 41 on shoulder 36 in the crankcase opening 17 without setting up undesirable stresses, which could easily be disastrous to a crankcase formed of a metal such as aluminum alloy. The ring 42 is formed of steel or iron as is the cylinder 11 and seats easily upon shoulder 36 of crankcase 16 and so the inequalities are absorbed between the ring and the flange. Furthermore, since the ring 42 is separate from the crankcase and the cylinder, it is easy to remove the ring and to reduce the length of the ring flange 44 for reducing the amount of compression or deformation of the seal 48.

The ring 42 may be split if desired for easy assembly with the crankcase 16 or the cylinder 11. During assembly it may be applied either to the crankcase or to the cylinder.

Adjustment of the cylinder with respect to the crankcase as from the position of Fig. 3 to that of Fig. 2 is accomplished by a nut 49 engaging an external threaded portion 50 on the cylinder 11. The nut has beveled teeth 51 engageable by a pinion 52 formed on the inner end of a tool 53 inserted into the crankcase 16 through an opening 54 formed therein. The outer end of the tool is formed hexagonally as indicated at 55 for engagement by a suitable tool such as a wrench. A threaded sleeve 56 engages a threaded enlargement 57 of the opening 54 and is retained on the tool 53 between a shoulder 58 and a collar 59. When the tool 53 is not in the opening 54, the opening is closed by a threaded plug 60 engaging the threaded enlargement 57 of the opening (Fig. 1). Fitted between the nut 49 and the shoulder 39 is a washer 61. Rotation of the nut 51 by the tool 53 acting through the beveled teeth 51 and the pinion 52 draws the cylinder 11 upwardly, since the nut 49 abuts the shoulder 39 through the washer 61. This causes the cylinder to move from the position of Fig. 3 to that of Fig. 2 and so brings the seal 48 from an undeformed or uncompressed assembled and contained state to a deformed or compressed state.

Between the flange 41 and the threaded portion 50 is formed a shallow external groove 62 receiving a seal 63 formed of rubber or other suitable material. The seal 63 may before assembly be of slightly frusto-conical form as indicated by the dash-dot line in Fig. 5.

There are provided a coolant passage 64 in the crankcase 16 and a coolant passage 65 in the head 19, the passages being joined by a space 66 between the crankcase 16 and the cylinder 11 below the seal 48.

If it be regarded that the ring 42 when assembled within the crankcase 16 is part of the crankcase, then the cylindrical flange 44 of the ring 42 may be considered to provide the crankcase opening 17 with a portion of smaller diameter than that of the portion 35, and a shoulder between these portions causing deformation of the seal 48, and the radial flange 43 of the ring 42 may be considered to provide the crankcase opening with a shoulder engaging the cylinder flange 41.

It is claimed:

1. In combination, a first member provided with an opening having a portion of a certain diameter at one region and an inwardly extending shoulder at one end of the portion, a second member positioned in the opening and having a part in close proximity to the said portion of the opening and a flange spaced from the part so as to form therewith an external annular groove and extending outwardly in somewhat spaced relation to the shoulder and into spaced adjacency with the said portion of the opening, a deformable seal positioned in the space between the flange and the part of the second member and within the said portion of the opening in the first member, and a ring having a radial flange extending inwardly between the shoulder and the flange on the second member and a cylindrical flange extending from the radial flange between the said portion of the opening in the first member and the flange of the second member and beyond the last mentioned flange into the seal so as to deform the seal into good sealing relation with the first and second members.

2. In combination, a first member provided with an opening having a portion of a certain diameter at one region and an inwardly extending shoulder at one end of the portion, the portion and the shoulder being joined in a relatively large radius, a second member positioned in the opening and having a part in close proximity to the said portion of the opening and a flange spaced from the part so as to form an external annular groove and extending outwardly and having a radial face in somewhat spaced relation to the shoulder and a cylindrical face in somewhat spaced relation to the said portion of the opening, the radial and cylindrical faces being joined in a relatively small radius, a deformable seal positioned in the space between the flange and the part of the second member and within the said portion of the opening in the first member, and a ring having a radial flange extending inwardly between the shoulder and the flange on the second member and a cylindrical flange extending from the radial flange between the said portion of the opening in the first member and the flange of the second member and beyond the last mentioned flange into the seal so as to deform the seal into good sealing relation with the first and second members, the outer faces of the ring flanges being joined in a relatively large radius mating with the relatively large radius joining the shoulder and the said portion of the opening in the crankcase and the inner faces of the ring flanges being joined in a relatively small radius mating with the relatively small radius joining the faces of the flange on the cylinder.

3. In combination, a first member provided with an opening having a first portion of one diameter at one region, a second portion of a less diameter at an adjacent region, a first shoulder joining the portions, a second shoulder extending inwardly from the second portion, a second member positioned within the opening and having a first part in close proximity with the first portion of the opening and a flange spaced from the part and extending outwardly in contact with the second shoulder and into proximity with the second portion, a deformable seal positioned between the flange and the part of the second member and within the first portion of the opening in the crankcase, the first shoulder on the opening in the crankcase being between the flange and the part of the second member so as to be pressed into the seal for causing it to have good sealing relation with the first and second members.

4. In an engine, a crankcase provided with an opening having a portion of a certain diameter at one region and a first inwardly extending shoulder at one end of the portion, a cylinder positioned within the opening and having a first flange extending outwardly into close proximity with the said portion of the opening and a second flange extending outwardly in somewhat spaced relation to the first shoulder and into spaced adjacency with the said portion of the opening, a deformable seal positioned within the said portion of the opening and between the flanges of the cylinder, a ring having a radial flange extending inwardly between the first shoulder and the second flange and a cylindrical flange extending from the radial flange between the said portion of the opening and the second flange of the cylinder and beyond the second flange toward the first flange into the seal so as to deform it and to make it have good sealing contact with the said portion of the opening in the crankcase and with the cylinder, the crankcase having in its opening a second shoulder spaced from the first shoulder, the cylinder carrying an external thread, and a nut engaging the thread and the second shoulder for adjusting the cylinder with respect to the crankcase to cause the cylindrical flange of the ring to extend into the seal as aforesaid.

JOHN P. BUTTERFIELD.

REFERENCES CITED

The following references are of record in the file of this patent:

UNITED STATES PATENTS

| Number | Name | Date |
|---|---|---|
| 634,820 | Henry et al. | Oct. 10, 1899 |
| 1,720,510 | Chorlton | July 9, 1929 |
| 1,882,616 | Hutchinson | Oct. 11, 1932 |
| 2,137,391 | Chilton | Nov. 22, 1938 |

FOREIGN PATENTS

| Number | Country | Date |
|---|---|---|
| 19,044 | Netherlands | Nov. 15, 1928 |